US012260819B2

United States Patent

(12) United States Patent
Lim et al.

(10) Patent No.: US 12,260,819 B2
(45) Date of Patent: Mar. 25, 2025

(54) DRIVING CONTROLLER, DISPLAY DEVICE, AND METHOD OF DRIVING DISPLAY DEVICE

(71) Applicant: Samsung Display Co., Ltd., Yongin-Si (KR)

(72) Inventors: Namjae Lim, Yongin-si (KR); Seokgyu Ban, Yongin-si (KR); Sangmyeon Han, Yongin-si (KR); Seungho Park, Yongin-si (KR); Byoungkwan An, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 18/213,898

(22) Filed: Jun. 26, 2023

(65) Prior Publication Data

US 2024/0096279 A1 Mar. 21, 2024

(30) Foreign Application Priority Data

Sep. 21, 2022 (KR) ........................ 10-2022-0119048

(51) Int. Cl.
*G09G 3/3233* (2016.01)
*G09G 3/20* (2006.01)

(52) U.S. Cl.
CPC ......... *G09G 3/3233* (2013.01); *G09G 3/2007* (2013.01); *G09G 2300/0842* (2013.01); *G09G 2310/08* (2013.01); *G09G 2320/045* (2013.01); *G09G 2330/021* (2013.01); *G09G 2330/10* (2013.01)

(58) Field of Classification Search
None
See application file for complete search history.

(56) References Cited

U.S. PATENT DOCUMENTS

| | | | | |
|---|---|---|---|---|
| 9,125,278 B2 | 9/2015 | Nathan et al. | | |
| 9,721,512 B2 | 8/2017 | Soni et al. | | |
| 2009/0147032 A1* | 6/2009 | Kim | G09G 3/3225 | 345/76 |
| 2014/0111567 A1* | 4/2014 | Nathan | G09G 3/3233 | 345/694 |

(Continued)

FOREIGN PATENT DOCUMENTS

KR 10-2306070 B1 9/2021

*Primary Examiner* — Robin J Mishler
*Assistant Examiner* — Amen W Bogale
(74) *Attorney, Agent, or Firm* — Innovation Counsel LLP

(57) ABSTRACT

A display device includes a display unit which includes a plurality of pixels, a degradation controller which includes a voltage compensator configured to calculate a driving voltage increase amount based on a degradation amount of a maximum degradation pixel among the pixels and a global current controller configured to calculate calculates a first scale factor for compensating a power increase amount according to the driving voltage increase amount, a driving voltage provider which is configured to increase a driving voltage provided to the pixels based on the driving voltage increase amount, a data compensator which is configured to generate output image data by scaling the first scale factor to grayscale values of input image data, and a data driver which is configured to provide data voltages to the pixels based on the output image data.

20 Claims, 8 Drawing Sheets

(56) References Cited

U.S. PATENT DOCUMENTS

| | | | | |
|---|---|---|---|---|
| 2020/0365091 | A1 * | 11/2020 | Pyun | G09G 3/3283 |
| 2022/0044619 | A1 * | 2/2022 | Sohn | G09G 3/2092 |
| 2022/0366858 | A1 * | 11/2022 | Sohn | G09G 3/006 |

* cited by examiner

FIG. 4

| GV=64 | | | |
|---|---|---|---|
| DA | Δ VD | Δ $V_{EL}$ | Δ $V_{DS}$ |
| 0 | 0 | 0 | 0 |
| 128 | 0.1 | 0.2 | 0.1 |
| 256 | 0.2 | 0.4 | 0.2 |
| 384 | 0.3 | 0.6 | 0.3 |
| 512 | 0.4 | 0.8 | 0.4 |
| 640 | 0.5 | 1 | 0.5 |
| 768 | 0.6 | 1.2 | 0.6 |
| 896 | 0.7 | 1.4 | 0.7 |
| 1024 | 0.8 | 1.6 | 0.8 |

...

| GV=128 | | | |
|---|---|---|---|
| DA | Δ VD | Δ $V_{EL}$ | Δ $V_{DS}$ |
| 0 | 0 | 0 | 0 |
| 128 | 0.15 | 0.21 | 0.11 |
| 256 | 0.3 | 0.42 | 0.22 |
| 384 | 0.45 | 0.63 | 0.33 |
| 512 | 0.6 | 0.84 | 0.44 |
| 640 | 0.75 | 1.05 | 0.55 |
| 768 | 0.9 | 1.26 | 0.66 |
| 896 | 1.05 | 1.47 | 0.77 |
| 1024 | 1.2 | 1.68 | 0.88 |

...

| GV=192 | | | |
|---|---|---|---|
| DA | Δ VD | Δ $V_{EL}$ | Δ $V_{DS}$ |
| 0 | 0 | 0 | 0 |
| 128 | 0.16 | 0.22 | 0.13 |
| 256 | 0.32 | 0.44 | 0.26 |
| 384 | 0.48 | 0.66 | 0.39 |
| 512 | 0.64 | 0.88 | 0.52 |
| 640 | 0.8 | 1.1 | 0.65 |
| 768 | 0.96 | 1.32 | 0.78 |
| 896 | 1.12 | 1.54 | 0.91 |
| 1024 | 1.28 | 1.76 | 1.04 |

...

| GV=255 | | | |
|---|---|---|---|
| DA | Δ VD | Δ $V_{EL}$ | Δ $V_{DS}$ |
| 0 | 0 | 0 | 0 |
| 128 | 0 | 0.23 | 0 |
| 256 | 0 | 0.46 | 0 |
| 384 | 0 | 0.69 | 0 |
| 512 | 0 | 0.92 | 0 |
| 640 | 0 | 1.15 | 0 |
| 768 | 0 | 1.38 | 0 |
| 896 | 0 | 1.61 | 0 |
| 1024 | 0 | 1.84 | 0 |

...

DRIVING CONTROLLER, DISPLAY DEVICE, AND METHOD OF DRIVING DISPLAY DEVICE

CROSS-REFERENCE TO RELATED APPLICATION(S)

This application claims priority under 35 USC § 119 to Korean Patent Application No. 10-2022-0119048 filed on Sep. 21, 2022, in the Korean Intellectual Property Office (KIPO), the entire disclosure of which is incorporated by reference herein.

BACKGROUND

1. Field

Embodiments relate to a display device. More particularly, embodiments relate to a driving controller, a display device including the driving controller, and a method of driving the display device.

2. Description of the Related Art

A display device may include a plurality of pixels. Each of the pixels may include a light emitting diode and a driving transistor providing a current to the light emitting diode.

According to the use of the display device, the pixels may be degraded, and luminance of the degraded pixels may decrease. In order to compensate the degradation of the pixel, a current flowing through the light emitting diode may increase. In order to increase the current flowing through the light emitting diode, a data voltage provided to a gate electrode of the driving transistor may increase.

However, although the data voltage increases, when the pixel is degraded, a voltage of the light emitting diode and/or a drain-source voltage of the driving transistor may decrease, so that the current flowing through the light emitting diode of the degraded pixel may not sufficiently increase. Further, when the voltage of the light emitting diode increases, power of the light emitting diode may increase, so that power consumption of the display device may increase.

SUMMARY

Embodiments provide a driving controller for compensating degradation of a pixel and reducing power consumption of a display device, a display device including the driving controller, and a method of driving a display device using the driving controller.

A display device according to embodiments may include a display unit which includes a plurality of pixels, a degradation controller which includes a voltage compensator configured to calculate calculates a driving voltage increase amount based on a degradation amount of a maximum degradation pixel among the pixels and a global current controller configured to calculate a first scale factor for compensating a power increase amount according to the driving voltage increase amount, a driving voltage provider which is configured to increase a driving voltage provided to the pixels based on the driving voltage increase amount, a data compensator which is configured to generate output image data by scaling the first scale factor to grayscale values of input image data, and a data driver which is configured to provide data voltages to the pixels based on the output image data.

In an embodiment, the degradation controller may further include a degradation storage which generates a grayscale value applied to the maximum degradation pixel. The global current controller which generates the first scale factor based on a ratio of the driving voltage increase amount to the driving voltage before the driving voltage is increased.

In an embodiment, the degradation storage may store degradation amounts of the pixels. The degradation storage may be configured to determine the maximum degradation pixel among the pixels, and may extract the grayscale value applied to the maximum degradation pixel from the input image data.

In an embodiment, the data compensator may be configured to generate the output image data by compensating the input image data based on degradation information of the pixels.

In an embodiment, the global current controller may be configured to calculate a second scale factor for compensating a global current increase amount according to a compensation of the input image data. The data compensator may be configured to generate the output image data by scaling the second scale factor to the grayscale values of the input image data.

In an embodiment, the global current controller may be configured to calculate the global current increase amount by subtracting a global current before compensation, which is calculated based on the input image data, from a global current after compensation, which flows through the pixels.

In an embodiment, the degradation information of the pixels may be generated based on the degradation amounts of the pixels stored in the degradation storage.

In an embodiment, the degradation information of the pixels may be generated based on sensing currents flowing through the pixels.

In an embodiment, the maximum degradation pixel may include a light emitting diode electrically connected between a driving voltage line transmitting the driving voltage and a common voltage line transmitting a common voltage, and a driving transistor connected between the driving voltage line and the light emitting diode.

In an embodiment, the driving voltage increase amount may be a sum of a voltage increase amount of the light emitting diode and a drain-source voltage increase amount of the driving transistor.

In an embodiment, the voltage compensator may include a lookup table storing the voltage increase amount of the light emitting diode and the drain-source voltage increase amount corresponding to each grayscale value and each degradation amount.

A method of driving a display device according to embodiments may include calculating a driving voltage increase amount based on a degradation amount of a maximum degradation pixel among pixels, increasing a driving voltage provided to the pixels based on the driving voltage increase amount, calculating a first scale factor for compensating a power increase amount according to the driving voltage increase amount, generating output image data based on input image data, and providing data voltages to the pixels based on the output image data. Generating the output image data may include scaling the first scale factor to grayscale values of the input image data.

In an embodiment, the driving voltage increase amount may be calculated based on the degradation amount of the maximum degradation pixel and a grayscale value applied to the maximum degradation pixel. The first scale factor may be calculated based on a ratio of the driving voltage increase amount to the driving voltage before the driving voltage is increased.

In an embodiment, the method may further include determining the maximum degradation pixel among the pixels and extracting the grayscale value applied to the maximum degradation pixel from the input image data.

In an embodiment, the generating the output image data may further include compensating the input image data based on degradation information of the pixels.

In an embodiment, the method may further include calculating a second scale factor for compensating a global current increase amount according to a compensation of the input image data. The generating the output image data may further include scaling the second scale factor to the grayscale values of the input image data.

In an embodiment, the global current increase amount may be calculated by subtracting a global current before compensation, which is calculated based on the input image data, from a global current after compensation, which flows through the pixels.

In an embodiment, the degradation information of the pixels may be generated based on degradation amounts of the pixels stored in a degradation storage.

In an embodiment, the degradation information of the pixels may be generated based on sensing currents flowing through the pixels.

A driving controller according to embodiments may include a degradation controller which is configured to calculate a driving voltage increase amount based on a degradation amount of a maximum degradation pixel among pixels and calculate a first scale factor for compensating a power increase amount according to the driving voltage increase amount, and a data compensator which is configured to generate output image data by scaling the first scale factor to grayscale values of input image data.

In the driving controller, the display device including the driving controller, and the method of driving the display device using the driving controller according to the embodiments, a driving voltage may increase based on degradation information of a pixel, so that a degradation of the pixel may be compensated. Further, a global current may decrease to compensate power increase according to the increase of the driving voltage, so that power consumption of the display device may be reduced.

BRIEF DESCRIPTION OF THE DRAWINGS

Illustrative, non-limiting embodiments will be more clearly understood from the following detailed description taken in conjunction with the accompanying drawings.

FIG. 4 is a diagram for describing a lookup table included in a voltage compensator of a degradation controller of the driving controller in FIG. 3.

DETAILED DESCRIPTION OF THE EMBODIMENTS

Figure 1:
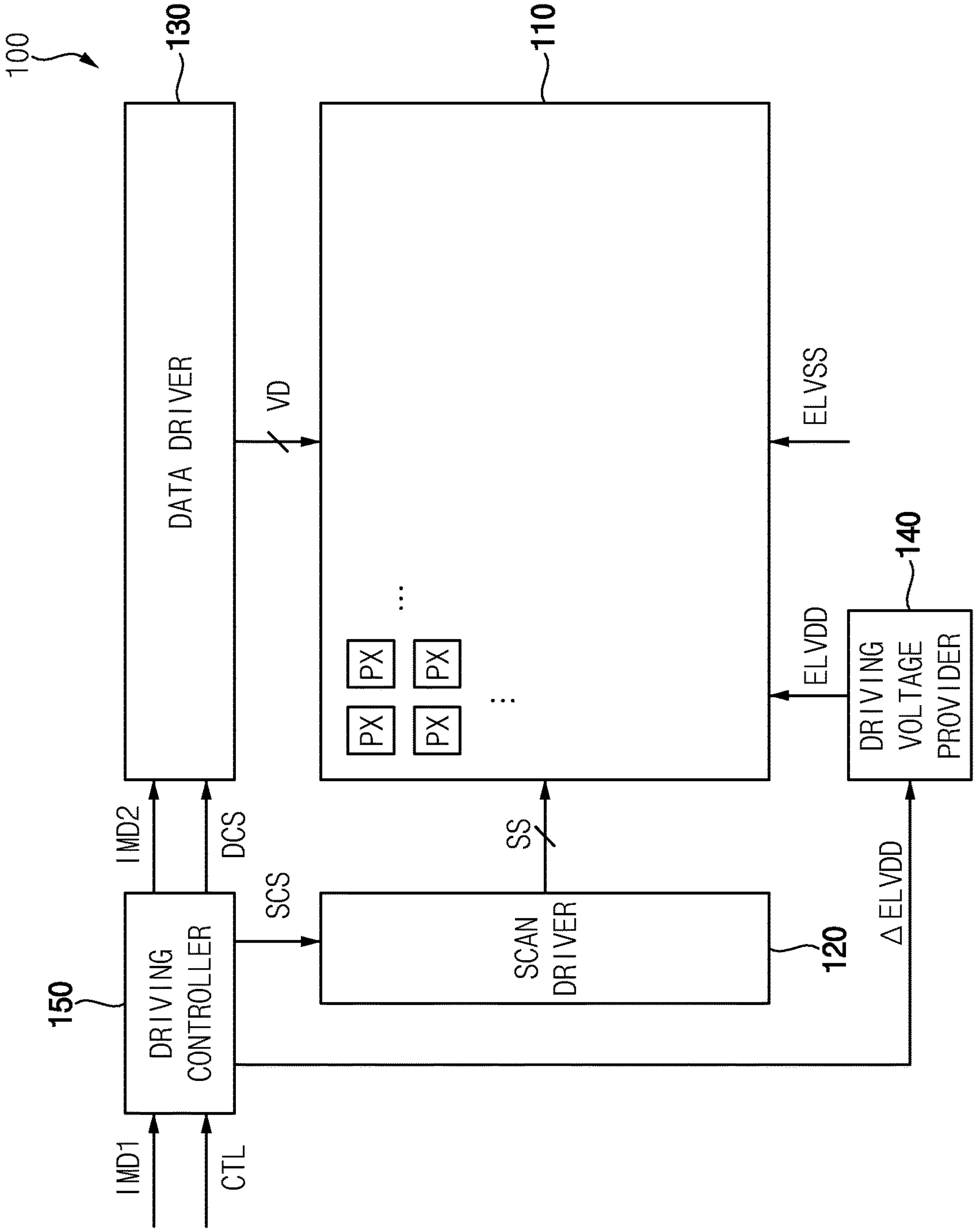
FIG. 1 is a block diagram illustrating a display device according to an embodiment.

Hereinafter, a driving controller, a display device, and a method of driving a display device according to embodiments of the present disclosure will be described in more detail with reference to the accompanying drawings. The same or similar reference numerals will be used for the same elements in the accompanying drawings.

FIG. 1 is a block diagram illustrating a display device 100 according to an embodiment.

Referring to FIG. 1, a display device 100 may include a display unit 110, a scan driver 120, a data driver 130, a driving voltage provider 140, and a driving controller 150.

The display unit 110 may include a plurality of pixels PX. In an embodiment, the pixels PX may include red pixels emitting red light, green pixels emitting green light, and blue pixels emitting blue light. The pixels PX may define pixel rows and pixel columns. The display unit 110 may be disposed in a display area of a display panel included in the display device 100.

The scan driver 120 may provide scan signals SS to the pixels PX. The scan driver 120 may provide the sequentially shifted scan signals SS to the pixel rows, respectively. The scan driver 120 may generate the scan signals SS based on a first control signal SCS. The first control signal SCS may include a scan start signal, a scan clock signal, or the like. In an embodiment, the scan driver 120 may be disposed in a non-display area of the display panel.

The data driver 130 may provide data voltages VD to the pixels PX. The data driver 130 may generate the data voltages VD based on output image data IMD2 and a second control signal DCS. The output image data IMD2 may include grayscale values corresponding to the pixels PX. The second control signal DCS may include a data start signal, a data clock signal, a load signal, or the like. The data voltages VD may correspond to the grayscale values of the output image data IMD2. In an embodiment, the data driver 130 may be disposed in the non-display area of the display panel, or may be disposed on a printed circuit board connected to the display panel.

The driving voltage provider 140 may provide a driving voltage ELVDD to the pixels PX. The driving voltage provider 140 may increase the driving voltage ELVDD based on a driving voltage increase amount ΔELVDD received from the driving controller 150. The driving voltage provider 140 may increase the driving voltage ELVDD by adding the driving voltage increase amount ΔELVDD to the driving voltage ELVDD before being increased. In an embodiment, the driving voltage provider 140 may be disposed in the non-display area of the display panel, or may be disposed on a printed circuit board connected to the display panel.

A common voltage ELVSS may be provided to the pixels PX. A voltage level of the common voltage ELVSS may be lower than a voltage level of the driving voltage ELVDD. The driving voltage provider 140 may supply the common voltage ELVSS to the pixels PX.

The driving controller 150 may control an operation of the scan driver 120 and an operation of the data driver 130. In an embodiment, the driving controller 150 may be a timing controller. The driving controller 150 may generate the output image data IMD2, the first control signal GCS, the second control signal DCS, and the driving voltage increase amount ΔELVDD based on input image data IMD1 and a control signal CTL provided from the outside. The input image data IMD1 may include grayscale values corresponding to the pixels PX. The control signal CTL may include a clock signal, a vertical synchronization signal, a horizontal synchronization signal, or the like. In an embodiment, the driving controller 150 may be disposed in the non-display area of the display panel, or may be disposed on a printed circuit board connected to the display panel.

Figure 2:
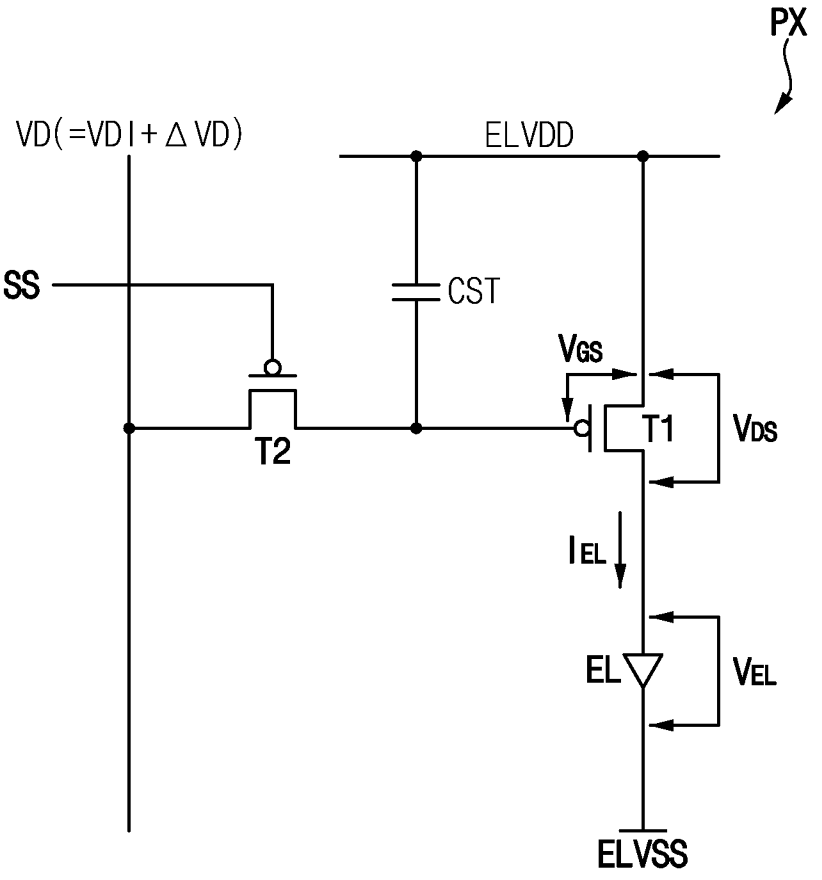
FIG. 2 is a circuit diagram illustrating a pixel according to an embodiment.

FIG. 2 is a circuit diagram illustrating a pixel PX according to an embodiment.

Referring to FIG. 2, a pixel PX may include a light emitting diode EL, a first transistor T1, a second transistor T2, and a storage capacitor CST.

The light emitting diode EL may emit light based on a current $I_{EL}$ flowing through the light emitting diode EL. The light emitting diode EL may be electrically connected between a driving voltage line transmitting the driving voltage ELVDD and a common voltage line transmitting the common voltage ELVSS. A first electrode (e.g., an anode electrode) of the light emitting diode EL may be connected to a second electrode of the first transistor T1, and a second electrode (e.g., a cathode electrode) of the light emitting diode EL may be connected to the common voltage line. In an embodiment, the light emitting diode EL may be an organic light emitting diode. In another embodiment, the light emitting diode EL may be a quantum dot light emitting diode, an inorganic light emitting diode, or the like.

The first transistor T1 may provide the current $I_{EL}$ to the light emitting diode EL. The first transistor T1 may be connected between the driving voltage line and the light emitting diode EL. A first electrode (e.g., a source electrode) of the first transistor T1 may be connected to the driving voltage line, and a second electrode (e.g., a drain electrode) of the first transistor T1 may be connected to the first electrode of the light emitting diode EL. A gate electrode of the first transistor T1 may be connected to a second electrode of the second transistor T2. The first transistor T1 may be referred to as a driving transistor.

The second transistor T2 may provide the data voltage VD to the gate electrode of the first transistor T1 in response to the scan signal SS. The second transistor T2 may be connected between a data line transmitting the data voltage VD and the gate electrode of the first transistor T1. A first electrode (e.g., a source electrode) of the second transistor T2 may be connected to the data line, and a second electrode (e.g., a drain electrode) of the second transistor T2 may be connected to the gate electrode of the first transistor T1. A gate electrode of the second transistor T2 may be connected to a scan line transmitting the scan signal SS. The second transistor T2 may be referred to as a switching transistor.

FIG. 2 illustrates an embodiment in which each of the first transistor T1 and the second transistor T2 is a P-type transistor (e.g., a PMOS transistor), but the present disclosure is not limited thereto. In another embodiment, at least one of the first transistor T1 and the second transistor T2 may be an N-type transistor (e.g., an NMOS transistor).

The storage capacitor CST may maintain a voltage between the first electrode and the gate electrode of the first transistor T1. A first electrode of the storage capacitor CST may be connected to the gate electrode of the first transistor T1, and a second electrode of the storage capacitor CST may be connected to the driving voltage line.

FIG. 2 illustrates an embodiment in which the pixel PX includes two transistors and one capacitor, but the present disclosure is not limited thereto. In another embodiment, the pixel PX may include three or more transistors and/or two or more capacitors.

Figure 3:
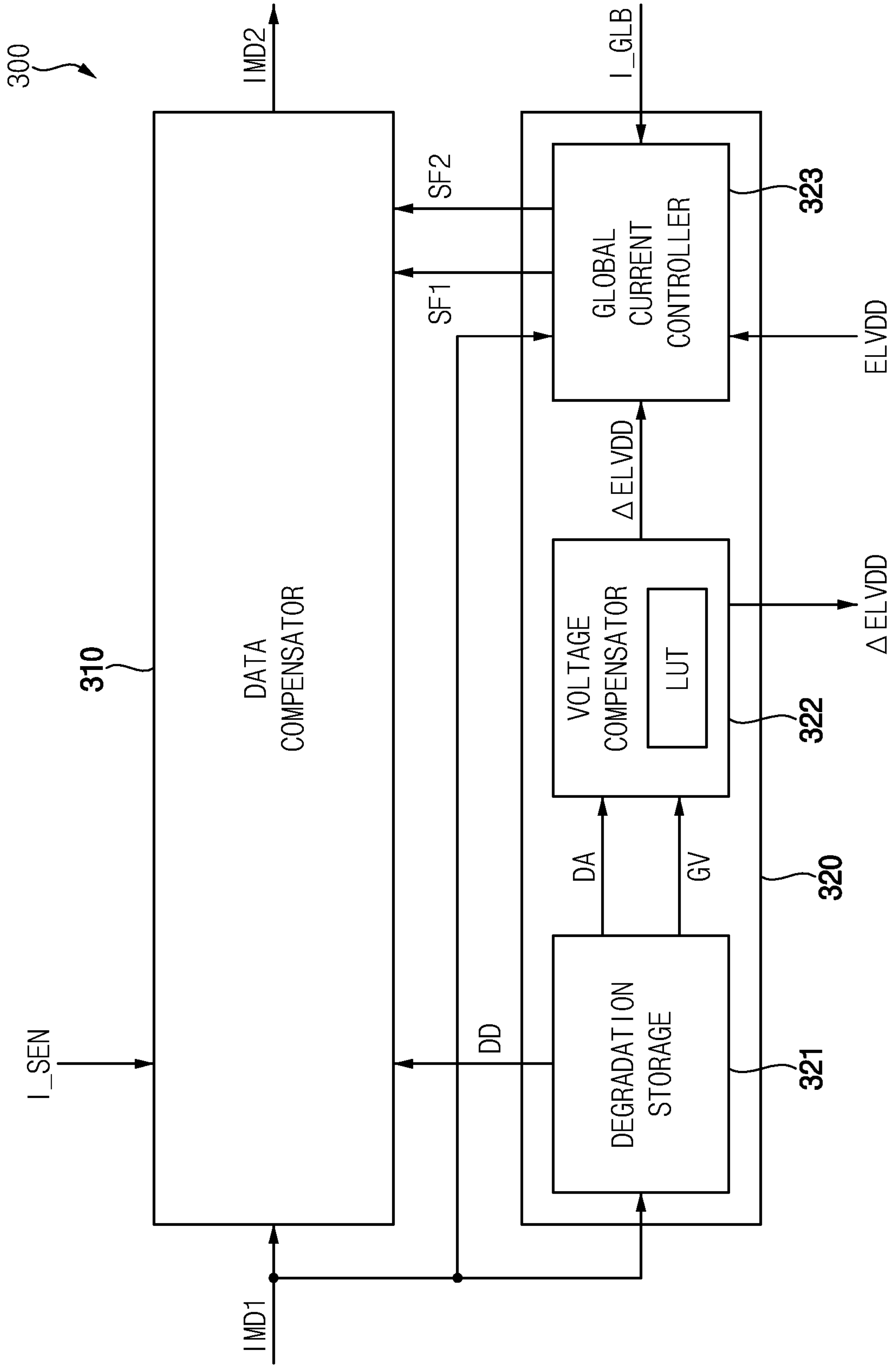
FIG. 3 is a block diagram illustrating a driving controller according to an embodiment.

FIG. 3 is a block diagram illustrating a driving controller 300 according to an embodiment.

Referring to FIG. 3, a driving controller 300, which corresponds to 150 in FIG. 1, may include a data compensator 310 and a degradation controller 320.

The data compensator 310 may generate the output image data IMD2 based on the input image data IMD1.

The degradation controller 320 may generate the driving voltage increase amount ΔELVDD, a degradation data DD, a first scale factor SF1, and a second scale factor SF2 based on the input image data IMD1. The degradation controller 320 may include a degradation storage 321, a voltage compensator 322, and a global current controller 323.

The degradation storage 321 may store degradation amounts of the pixels PX. For example, the degradation amounts of the pixels PX may be degradation times of the pixels PX. The degradation storage 321 may include a memory for storing the degradation amounts of the pixels PX. For example, the memory may be a volatile memory such as a dynamic random access memory ("DRAM"), a static random access memory ("SRAM"), or the like. The degradation amounts of the pixels PX stored in the degradation storage 321 may be updated based on the grayscale values of the input image data IMD1.

The data compensator 310 may generate the output image data IMD2 by compensating the input image data IMD1 based on degradation information of the pixels PX. In an embodiment, the degradation information of the pixels PX may be generated based on the degradation amounts of the pixels PX stored in the degradation storage 321. In such an embodiment, the data compensator 310 may receive degradation data DD including the degradation amounts of the pixels PX from the degradation storage 321.

In another embodiment, the degradation information of the pixels PX may be generated based on sensing currents I_SEN flowing through the pixels PX. A threshold voltage of the light emitting diode EL of the pixel PX and/or a threshold voltage and an electron mobility of the first transistor T1 of the pixel PX may be calculated using the sensing current I_SEN flowing through the pixel PX. In such another embodiment, the data compensator 310 may receive the sensing currents I_SEN from a sensing circuit connected to the pixels PX through sensing lines. In this case, each of the pixels PX may further include a third transistor connected between a node between the first electrode of the light emitting diode EL and the second electrode of the first transistor T1, and the sensing line.

When the pixel PX is degraded, an efficiency of the light emitting diode EL included in the pixel PX may decrease. The efficiency of the light emitting diode EL may be proportional to a luminance of light emitted from the light emitting diode EL with respect to the current $I_{EL}$ flowing through the light emitting diode EL. The data compensator 310 may compensate degradation of the pixels PX by increasing the grayscale values of the input image data IMD1 corresponding to the pixels PX according to the degree of degradation of the pixels PX. For example, the data compensator 310 may generate the grayscale value of the output image data IMD2 by greatly increasing the grayscale value of the input image data IMD1 corresponding to the pixel PX when the degree of degradation of the pixel PX is large, and the data compensator 310 may generate the grayscale value of the output image data IMD2 by slightly increasing the grayscale value of the input image data IMD1 corresponding to the pixel PX when the degree of degradation of the pixel PX is small.

Referring to FIG. 2, the data voltage VD corresponding to the grayscale value of the output image data IMD2 may be the sum of an input data voltage VDI corresponding to the grayscale value of the input image data IMD1 and a data voltage increase amount ΔVD corresponding to an increase amount of the grayscale value increased by the data compensator 310. A gate-source voltage $V_{GS}$ of the first transistor T1 may increase as the data voltage VD increases, and accordingly, the current $I_{EL}$ flowing through the light emitting diode EL may increase. Accordingly, the luminance of light emitted from the light emitting diode EL may increase, and the degradation of the pixel PX may be compensated.

However, when the pixel PX is degraded, not only the efficiency of the light emitting diode EL may decrease, but also the voltage $V_{EL}$ across the light emitting diode EL may increase, and thus, a drain-source voltage $V_{DS}$ of the first transistor T1 may decrease. Further, when the gate-source voltage $V_{GS}$ of the first transistor T1 increases to compensate the degradation of the pixel PX, the drain-source voltage $V_{DS}$ of the first transistor T1 may decrease according to a change in current-voltage characteristic of the first transistor T1. When the drain-source voltage $V_{DS}$ of the first transistor T1 decreases, the current $I_{EL}$ flowing through the light emitting diode EL may decrease, and the degradation of the pixel PX may not be sufficiently compensated. Accordingly, it may be necessary to increase the driving voltage ELVDD in order to increase the drain-source voltage $V_{DS}$ of the first transistor T1.

The degradation storage 321 may determine a maximum degradation pixel among the pixels PX based on the stored degradation amounts of the pixels PX. For example, the maximum degradation pixel may be a pixel having the greatest degradation amount DA among the pixels PX.

The degradation storage 321 may extract the grayscale value GV applied to the maximum degradation pixel from the input image data IMD1. The degradation storage 321 may extract the grayscale value GV applied to the maximum degradation pixel among the grayscale values of the input image data IMD1 from the input image data IMD1.

The voltage compensator 322 may calculate the driving voltage increase amount ΔELVDD based on the degradation amount DA of the maximum degradation pixel and the grayscale value GV applied to the maximum degradation pixel.

FIG. 4 is a diagram for describing a lookup table LUT included in the voltage compensator 322 of the degradation controller 320 of the driving controller 300 in FIG. 3.

Referring to FIG. 4, the voltage compensator 322 may include a lookup table LUT for storing the voltage increase amount $\Delta V_{EL}$ of the light emitting diode EL and the drain-source voltage increase amount $\Delta V_{DS}$ of the first transistor T1 corresponding to each grayscale value GV and each degradation amount DA. The voltage increase amount $\Delta V_{EL}$ of the light emitting diode EL may vary according to the grayscale value GV and the degradation amount DA. For example, the voltage increase amount $\Delta V_{EL}$ of the light emitting diode EL may increase as the degradation amount DA increases although the grayscale value GV is the same, and the voltage increase amount $\Delta V_{EL}$ of the light emitting diode EL may increase as the grayscale value GV increases although the degradation amount DA is the same.

The drain-source voltage increase amount $\Delta V_{DS}$ of the first transistor T1 may vary according to the data voltage increase amount ΔVD, and the data voltage increase amount ΔVD may vary according to the grayscale value GV and the degradation amount DA. Accordingly, the drain-source voltage increase amount $\Delta V_{DS}$ of the first transistor T1 may vary according to the grayscale value GV and the degradation amount DA.

The voltage compensator 322 may extract the voltage increase amount $\Delta V_{EL}$ of the light emitting diode EL and the drain-source voltage increase amount $\Delta V_{DS}$ of the first transistor T1 corresponding to the degradation amount DA of the maximum degradation pixel and the grayscale value GV applied to the maximum degradation pixel from the lookup table LUT. The voltage compensator 322 may calculate the sum of the voltage increase amount $\Delta V_{EL}$ of the light emitting diode EL and the drain-source voltage increase amount $\Delta V_{DS}$ of the first transistor T1 as the driving voltage increase amount ΔELVDD. Accordingly, the voltage compensator 322 may calculate the driving voltage increase amount ΔELVDD in consideration of the degradation amount DA of the maximum degradation pixel and the grayscale value GV applied to the maximum degradation pixel.

The driving voltage provider 140 may increase the driving voltage ELVDD based on the driving voltage increase amount ΔELVDD provided from the voltage compensator 322. Accordingly, the drain-source voltage $V_{DS}$ of the first transistor T1 of each of the pixels PX may increase, so that the current $I_{EL}$ flowing through the light emitting diode EL may increase, and the degradation of the pixel PX may be fully compensated.

The global current controller 323 may calculate the first scale factor SF1 for compensating a power increase amount according to the driving voltage increase amount ΔELVDD. In other words, the global current controller 323 may calculate the first scale factor SF1 for reducing power consumption of the pixels PX after the increase of the driving voltage ELVDD to power consumption of the pixels PX before the increase of the driving voltage ELVDD. The global current controller 323 may calculate the first scale factor SF1 based on a ratio of the driving voltage increase amount ΔELVDD to the driving voltage ELVDD before the driving voltage ELVDD increases.

The data compensator 310 may generate the output image data IMD2 by scaling the first scale factor SF1 to the grayscale values of the input image data IMD1. Accordingly, the luminance of light emitted from the pixels PX may uniformly decrease, and the global current flowing through the pixels PX may decrease. Accordingly, the power consumption of the pixels PX, which increases as the driving voltage ELVDD increases, may be reduced to the power consumption of the pixels PX before the driving voltage ELVDD increases.

The global current controller 323 may calculate the second scale factor SF2 for compensating a global current increase amount according to the compensation of the input image data IMD1. In other words, the global current controller 323 may calculate the second scale factor SF2 for reducing power consumption of the pixels PX according to the compensation of the input image data IMD1 to power consumption of the pixels PX before the input image data IMD1 is compensated. The global current controller 323 may calculate the global current increase amount by subtracting a global current before the compensation of the input image data IMD1, which is calculated based on the input image data IMD1, from a global current I_GLB after the compensation of the input image data IMD1, which flows through the pixels PX.

The data compensator 310 may generate the output image data IMD2 by scaling the second scale factor SF2 to the grayscale values of the input image data IMD1. Accordingly, the luminance of light emitted from the pixels PX may uniformly decrease, and the global current flowing through the pixels PX may decrease. Accordingly, the power consumption of the pixels PX, which increases according to the compensation of the input image data IMD1, may be reduced to the power consumption of the pixels PX before the input image data IMD1 is compensated.

FIG. 3 illustrates an embodiment in which the driving controller 300 includes the data compensator 310 and the degradation controller 320, but the present disclosure is not limited thereto. In another embodiment, at least one of the data compensator 310 and the degradation controller 320 may not be included in the driving controller 300, and may be separately provided.

Figure 5:
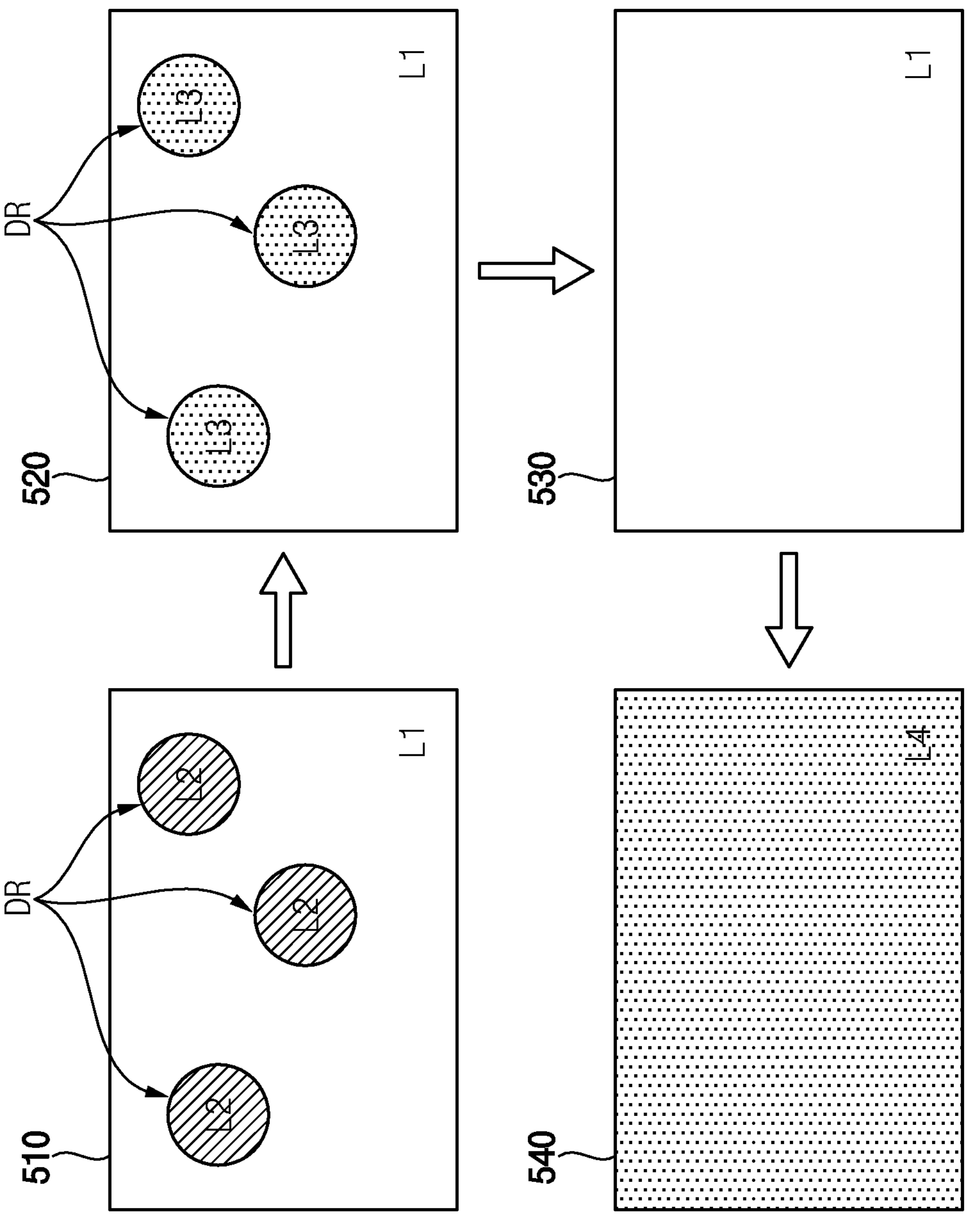
FIG. 5 is a diagram for describing display units according to an embodiment.
Figure 6:
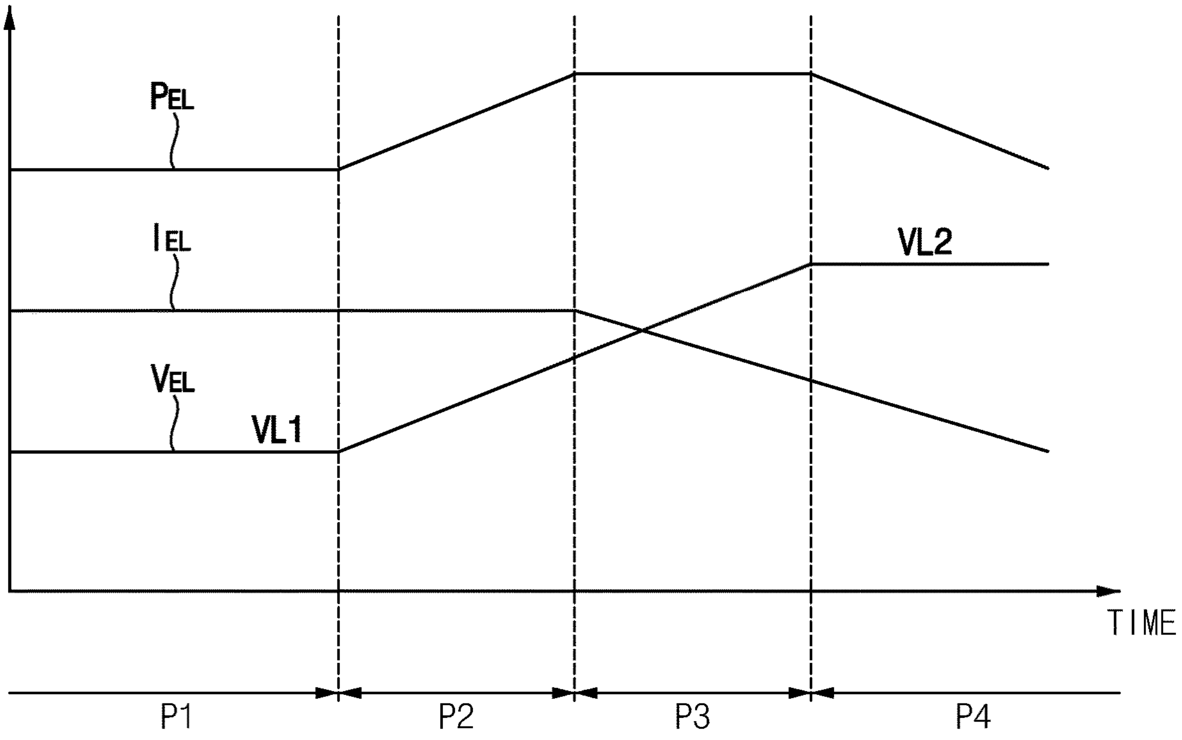
FIG. 6 is a graph illustrating a voltage, a current, and a power of a light emitting diode of a pixel according to an embodiment.

FIG. 5 is a diagram for describing display units 510, 520, 530, and 540 according to an embodiment. FIG. 6 is a graph illustrating a voltage $V_{EL}$, a current $I_{EL}$, and a power $P_{EL}$ of the light emitting diode EL of the pixel PX according to an embodiment.

Referring to FIGS. 5 and 6, a display unit 510 before the input image data IMD1 is compensated may include a degradation region DR having relatively low luminance due to degradation of the pixels PX. The luminance L2 of the degradation region DR may be lower than the luminance L1 of a region of the display unit 510 other than the degradation region DR.

In a first period P1, the input image data IMD1 may be compensated, and accordingly, the current $I_{EL}$ flowing through the light emitting diode EL of the pixel PX included in the degradation region DR of a display unit 520 may increase. The luminance L3 of the degradation region DR of the display unit 520 after the input image data IMD1 is compensated may be higher than the luminance L2 of the degradation region DR of the display unit 510 before the input image data IMD1 is compensated. However, as described above, the current $I_{EL}$ flowing through the light emitting diode EL of the pixel PX may decrease as the drain-source voltage $V_{DS}$ of the first transistor T1 of the pixel PX decreases, and the degradation of the pixels PX included in the degradation region DR may not be sufficiently compensated. Accordingly, the luminance L3 of the degradation region DR may be lower than the luminance L1 of a region of the display unit 520 other than the degradation region DR.

In a second period P2 and a third period P3, the driving voltage ELVDD may increase, and accordingly, the voltage $V_{EL}$ of the light emitting diode EL of the pixel PX included in a display unit 530 may increase from a first voltage level VL1 to a second voltage level VL2. The display unit 530 after the driving voltage ELVDD increases may not include the degradation region DR. Accordingly, the degradation of the pixels PX included in the display unit 530 may be sufficiently compensated. However, as the voltage $V_{EL}$ of the light emitting diode EL increases, the power $P_{EL}$ of the light emitting diode EL proportional to the product of the voltage $V_{EL}$ of the light emitting diode EL and the current $I_{EL}$ flowing through the light emitting diode EL may increase, and accordingly, power consumption of the pixels PX included in the display unit 530 may increase.

In the third period P3 and a fourth period P4, the first scale factor SF1 and the second scale factor SF2 may be scaled to the grayscale values of the input image data IMD1, and accordingly, the current $I_{EL}$ flowing through the light emitting diode EL of the pixel PX included in a display unit 540 may decrease. In the third period P3, although the voltage $V_{EL}$ of the light emitting diode EL of the pixel PX increases, since the current $I_{EL}$ flowing through the light emitting diode EL decreases, the power $P_{EL}$ of the light emitting diode EL may maintain. In the fourth period P4, since the voltage $V_{EL}$ of the light emitting diode EL of the pixel PX maintains and the current $I_{EL}$ flowing through the light emitting diode EL decreases, the power $P_{EL}$ of the light emitting diode EL may be reduced. The luminance L4 of the display unit 540 after scaling the first scale factor SF1 and the second scale factor SF2 to the grayscale values of the input image data IMD1 may be lower than the luminance L1 of the display unit 530 before scaling the first scale factor SF1 and the second scale factor SF2 to the grayscale values of the input image data IMD1.

Figure 7:
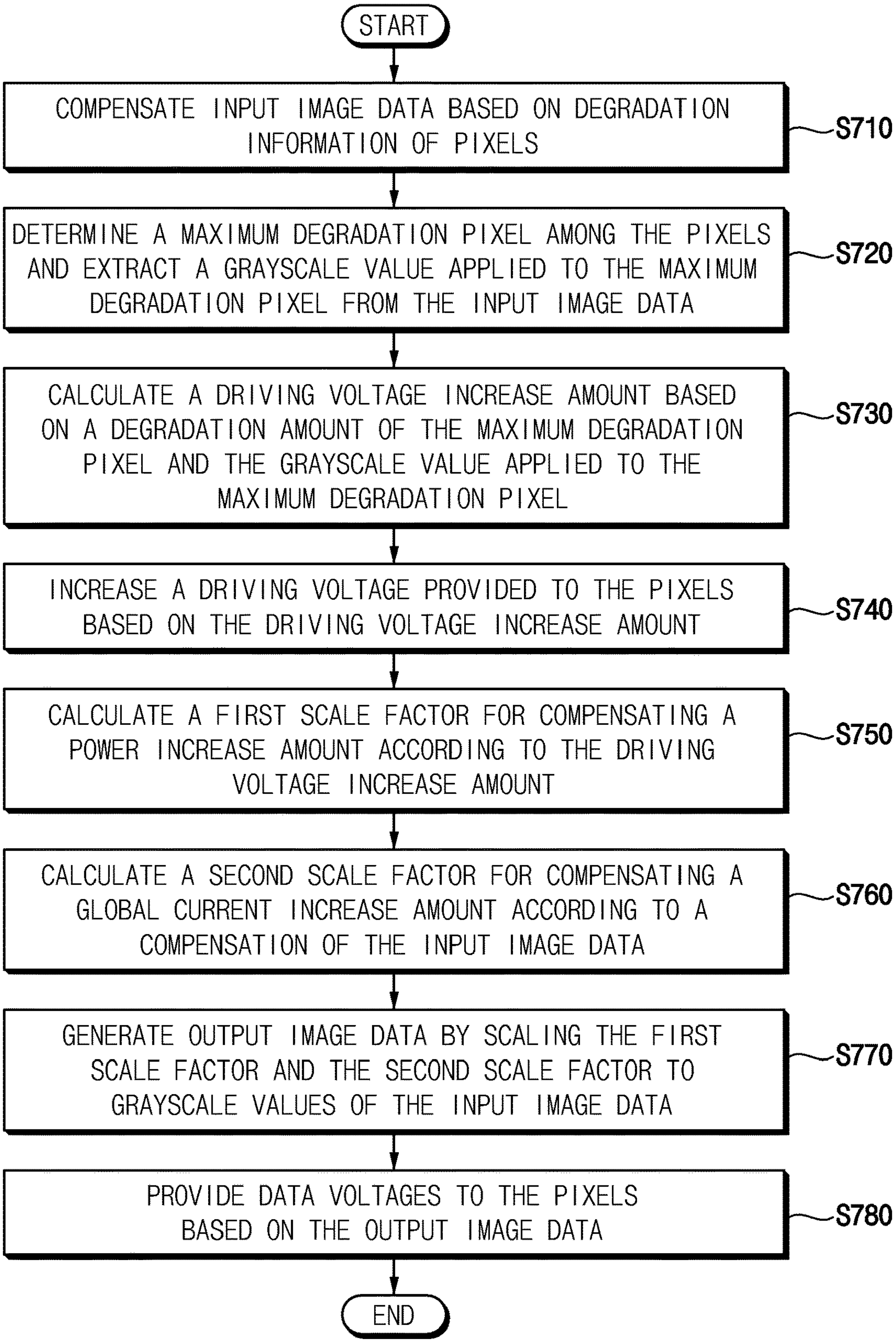
FIG. 7 is a flowchart illustrating a method of driving a display device according to an embodiment.

FIG. 7 is a flowchart illustrating a method of driving a display device according to an embodiment.

Referring to FIG. 7, in a method of driving a display device, the input image data IMD1 may be compensated based on the degradation information of the pixels PX (S710). In an embodiment, the degradation information of the pixels PX may be generated based on the degradation amounts of the pixels PX stored in the degradation storage 321. In another embodiment, the degradation information of the pixels PX may be generated based on the sensing currents I_SEN flowing through the pixels PX.

When the pixel PX is degraded, the efficiency of the light emitting diode EL included in the pixel PX may decrease. The degradation of the pixels PX may be compensated by increasing the grayscale values of the input image data IMD1 corresponding to the pixels PX according to the degree of degradation of the pixels PX.

The maximum degradation pixel may be determined among the pixels PX, and the grayscale value GV applied to the maximum degradation pixel may be extracted from the input image data IMD1 (S720). The maximum degradation pixel may be determined among the pixels PX based on the degradation amounts of the pixels PX stored in the degradation storage 321, and the grayscale value GV applied to the maximum degradation pixel among the grayscale values of the input image data IMD1 may be extracted from the input image data IMD1.

The driving voltage increase amount ΔELVDD may be calculated based on the degradation amount DA of the maximum degradation pixel and the grayscale value GV applied to the maximum degradation pixel (S730). The voltage increase amount $\Delta V_{EL}$ of the light emitting diode EL and the drain-source voltage increase amount $\Delta V_{DS}$ of the first transistor T1 corresponding to the degradation amount DA of the maximum degradation pixel and the grayscale value GV applied to the maximum degradation pixel may be extracted from the lookup table LUT for storing the voltage increase amount $\Delta V_{EL}$ of the light emitting diode EL and the drain-source voltage increase amount $\Delta V_{DS}$ of the first transistor T1 corresponding to each grayscale value GV and each degradation amount DA, and the sum of the voltage increase amount $\Delta V_{EL}$ of the light emitting diode EL and the drain-source voltage increase amount $\Delta V_{DS}$ of the first transistor T1 may be calculated as the driving voltage increase amount ΔELVDD.

The driving voltage ELVDD provided to the pixels PX may increase based on the driving voltage increase amount ΔELVDD (S740). Accordingly, the drain-source voltage $V_{DS}$ of the first transistor T1 of each of the pixels PX may increase, so that the current $I_{EL}$ flowing through the light emitting diode EL may increase, and the degradation of the pixel PX may be fully compensated.

The first scale factor SF1 for compensating the power increase amount according to the driving voltage increase amount ΔELVDD may be calculated (S750). The first scale factor SF1 may be calculated based on a ratio of the driving voltage increase amount ΔELVDD with respect to the driving voltage ELVDD before the driving voltage is increased.

The second scale factor SF2 for compensating the global current increase amount according to the compensation of the input image data IMD1 may be calculated (S760). The global current increase amount may be calculated by subtracting the global current before the compensation of the input image data IMD1, which is calculated based on the input image data IMD1, from the global current I_GLB after the compensation of the input image data IMD1, which flows through the pixels PX. In this embodiment, the calculation of second scale factor SF2 may be performed before the calculation of the first scale factor SF1 is performed, or the calculation of the first scale factor SF1 and the calculation of second scale factor SF2 may be performed at the same time.

The output image data IMD2 may be generated by scaling the first scale factor SF1 and the second scale factor SF2 to the grayscale values of the input image data IMD1 (S770). Accordingly, the luminance of light emitted from the pixels PX may uniformly decrease, and the global current flowing through the pixels PX may decrease. As the first scale factor SF1 scales the grayscale values of the input image data IMD1, the power consumption of the pixels PX increased according to the increase of the driving voltage ELVDD may be reduced to the power consumption of the pixels PX before the driving voltage ELVDD increases. As the second scale factor SF2 scales the grayscale values of the input image data IMD1, the power consumption of the pixels PX increased according to the compensation of the input image data IMD1 may be reduced to the power consumption of the pixels PX before the input image data IMD1 is compensated.

The data voltages VD may be provided to the pixels PX based on the output image data IMD2 (S780). The data voltages VD corresponding to the grayscale values of the output image data IMD2 generated by compensating the input image data IMD1 based on the degradation information of the pixels PX and scaling the first scale factor SF1 and the second scale factor SF2 to the grayscale value of the input image data IMD1 may be provided to the pixels PX, so that the degradation of the pixels PX may be compensated, and the power consumption of the pixels PX may be reduced.

Figure 8:
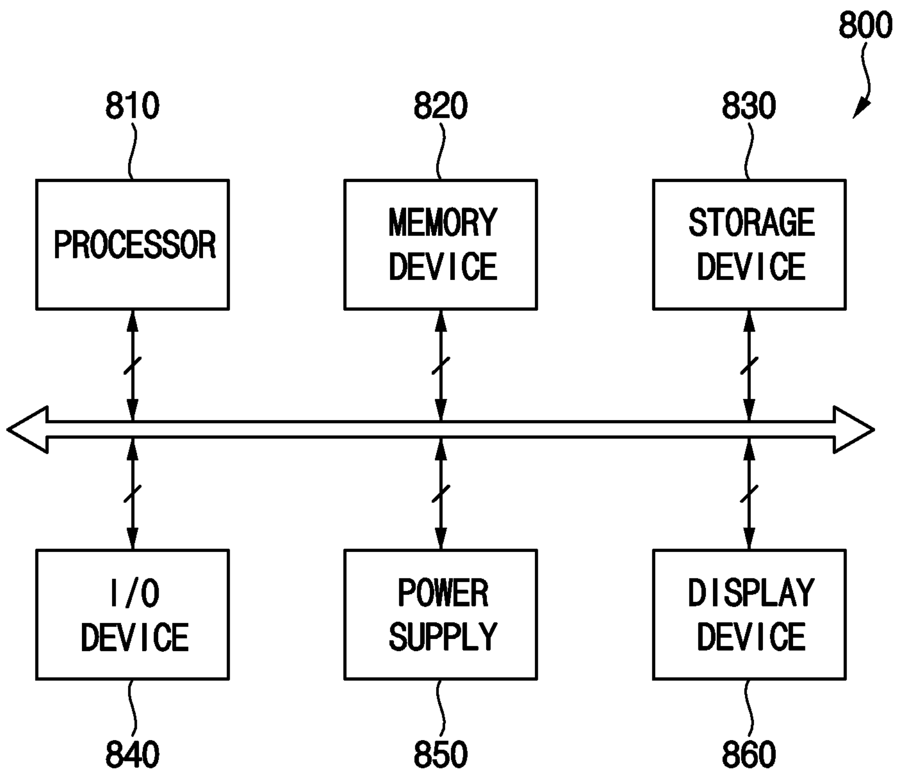
FIG. 8 is a block diagram illustrating an electronic apparatus including a display device according to an embodiment.

FIG. 8 is a block diagram illustrating an electronic apparatus 800 including a display device 860 according to an embodiment.

Referring to FIG. 8, the electronic apparatus 800 may include a processor 810, a memory device 820, a storage device 830, an input/output ("I/O") device 840, a power supply 850, and a display device 860. The display device 860 may be the display device 100 in FIG. 1. The electronic apparatus 800 may further include a plurality of ports for communicating with a video card, a sound card, a memory card, a universal serial bus ("USB") device, etc.

The processor 810 may perform particular calculations or tasks. In an embodiment, the processor 810 may be a microprocessor, a central processing unit ("CPU"), or the like. The processor 810 may be coupled to other components via an address bus, a control bus, a data bus, or the like. In an embodiment, the processor 810 may be coupled to an extended bus such as a peripheral component interconnection ("PCI") bus.

The memory device 820 may store data for operations of the electronic apparatus 800. In an embodiment, the memory device 820 may include a non-volatile memory device such as an erasable programmable read-only memory ("EPROM") device, an electrically erasable programmable read-only memory ("EEPROM") device, a flash memory device, a phase change random access memory ("PRAM") device, a resistance random access memory ("RRAM") device, a nano floating gate memory ("NFGM") device, a polymer random access memory ("PoRAM") device, a magnetic random access memory ("MRAM") device, a ferroelectric random access memory ("FRAM") device, etc., and/or a volatile memory device such as a dynamic random access memory ("DRAM") device, a static random access memory ("SRAM") device, a mobile DRAM device, etc.

The storage device 830 may include a solid state drive ("SSD") device, a hard disk drive ("HDD") device, a CD-ROM device, or the like. The I/O device 840 may include an input device such as a keyboard, a keypad, a touchpad, a touch-screen, a mouse device, etc., and an output device such as a speaker, a printer, etc. The power supply 850 may supply a power required for the operation of the electronic apparatus 800. The display device 860 may be coupled to other components via the buses or other communication links.

In the display device 860, a driving voltage may increase based on degradation information of a pixel, so that a degradation of the pixel may be compensated. Further, a global current may decrease to compensate power increase according to the increase of the driving voltage, so that power consumption of the display device 860 may be reduced.

The display device according to the embodiments may be applied to a display device included in an electronic apparatus such as a computer, a notebook, a mobile phone, a smart phone, a smart pad, a PMP, a PDA, an MP3 player, or the like.

Although the driving controllers, the display devices, and the methods of driving the display devices according to the embodiments have been described with reference to the drawings, the illustrated embodiments are examples, and may be modified and changed by a person having ordinary knowledge in the relevant technical field without departing from the technical spirit described in the following claims.

What is claimed is:

1. A display device, comprising: a display unit which includes a plurality of pixels disposed in the display unit; a degradation controller which includes a voltage compensator configured to calculate a driving voltage increase amount based on a degradation amount of a maximum degradation pixel among the pixels and a global current controller configured to calculate a first scale factor for compensating a power increase amount according to the driving voltage increase amount; a driving voltage provider which is configured to increase a driving voltage provided to the pixels based on the driving voltage increase amount; a data compensator which is configured to generate output image data by scaling the first scale factor to grayscale values of input image data; and a data driver which is configured to provide data voltages to the pixels based on the output image data, wherein the data driver receives the output image data modified from the input image data based on the first scale factor, and wherein the output image data modified from the input image data based on the first scale factor is received from the data compensator which is disposed outside the display unit and is not a part of the data driver.

2. The display device of claim 1, wherein the degradation controller further includes a degradation storage which generates a grayscale value applied to the maximum degradation pixel; and wherein the global current controller generates the first scale factor based on a ratio of the driving voltage increase amount to the driving voltage before the driving voltage is increased.

3. The display device of claim 2, wherein the degradation storage stores degradation amounts of the pixels, and wherein the degradation storage is configured to determine the maximum degradation pixel among the pixels and extract the grayscale value applied to the maximum degradation pixel from the input image data.

4. The display device of claim 3, wherein the data compensator is configured to generate the output image data by compensating the input image data based on degradation information of the pixels.

5. The display device of claim 4, wherein the global current controller is configured to calculate a second scale factor for compensating a global current increase amount according to a compensation of the input image data, and wherein the data compensator is configured to generate the output image data by scaling the second scale factor to the grayscale values of the input image data.

6. The display device of claim 5, wherein the global current controller is configured to calculate the global current increase amount by subtracting a global current before compensation, which is calculated based on the input image data, from a global current after compensation, which flows through the pixels.

7. The display device of claim 4, wherein the degradation information of the pixels is generated based on the degradation amounts of the pixels stored in the degradation storage.

8. The display device of claim 4, wherein the degradation information of the pixels is generated based on sensing currents flowing through the pixels.

9. The display device of claim 2, wherein the maximum degradation pixel includes:

a light emitting diode electrically connected between a driving voltage line transmitting the driving voltage and a common voltage line transmitting a common voltage; and a driving transistor connected between the driving voltage line and the light emitting diode.

10. The display device of claim 9, wherein the driving voltage increase amount is a sum of a voltage increase amount of the light emitting diode and a drain-source voltage increase amount of the driving transistor.

11. The display device of claim 10, wherein the voltage compensator includes a lookup table storing the voltage increase amount of the light emitting diode and the drain-source voltage increase amount corresponding to each grayscale value and each degradation amount.

12. A method of driving a display device, the method comprising:

calculating a driving voltage increase amount based on a degradation amount of a maximum degradation pixel among pixels, the pixels being disposed in a display unit;

increasing a driving voltage provided to the pixels based on the driving voltage increase amount;

calculating a first scale factor for compensating a power increase amount according to the driving voltage increase amount;

generating output image data based on input image data; and providing data voltages to the pixels based on the output image data by a data driver, wherein generating the output image data includes scaling the first scale factor to grayscale values of the input image data by a data compensator, wherein the data driver receives the output image data modified from the input image data based on the first scale factor, and wherein the output image data modified from the input image data based on the first scale factor is received from the data compensator which is disposed outside the display unit and is not a part of the data driver.

13. The method of claim 12, wherein the driving voltage increase amount is calculated based on the degradation amount of the maximum degradation pixel and a grayscale value applied to the maximum degradation pixel, and wherein the first scale factor is calculated based on a ratio of the driving voltage increase amount to the driving voltage before the driving voltage is increased.

14. The method of claim 13, further comprising:

determining the maximum degradation pixel among the pixels and extracting the grayscale value applied to the maximum degradation pixel from the input image data.

15. The method of claim 14, wherein the generating the output image data further includes compensating the input image data based on degradation information of the pixels.

16. The method of claim 15, further comprising:

calculating a second scale factor for compensating a global current increase amount according to a compensation of the input image data, and wherein the generating the output image data further includes scaling the second scale factor to the grayscale values of the input image data.

17. The method of claim 16, wherein the global current increase amount is calculated by subtracting a global current before compensation, which is calculated based on the input image data, from a global current after compensation, which flows through the pixels.

18. The method of claim 15, wherein the degradation information of the pixels is generated based on degradation amounts of the pixels stored in a degradation storage.

19. The method of claim 15, wherein the degradation information of the pixels is generated based on sensing currents flowing through the pixels.

20. A driving controller, comprising:

a degradation controller which is configured to calculate a driving voltage increase amount based on a degradation amount of a maximum degradation pixel among pixels, the pixels being disposed in a display unit, and calculate a first scale factor for compensating a power increase amount according to the driving voltage increase amount; and a data compensator which is configured to generate output image data by scaling the first scale factor to grayscale values of input image data, and provide the output image data modified from the input image data based on the first scale factor to a data driver, wherein the data compensator providing the output image data modified from the input image data based on the first scale factor is disposed outside the display unit and is not a part of the data driver.

* * * * *